Patented Apr. 23, 1935

1,998,947

UNITED STATES PATENT OFFICE 1,998,947

WELDING ELECTRODE AND PROCESS OF MAKING THE SAME

James M. Weed, Ballston Lake, N. Y., assignor to General Electric Company, a corporation of New York No Drawing. Application October 1, 1930, Serial No. 485,832

11 Claims. (Cl. 219—8)

My invention relates to electrodes for welding by the metallic arc method and to a process of making such electrodes. The present application is a continuation in part of my co-pending application, Serial No. 376,857, filed July 8, 1929.

In metallic arc welding the arc is maintained between a metal pencil, usually in the form of a rod, wire or strip called the welding electrode, and the work which constitutes the other electrode. During welding the electrode is fused or vaporized, or both, and the metal thereof is deposited upon and welded to the work. Either manual or automatic means may be provided for feeding the electrode toward the work at an appropriate speed to maintain the arc length substantially constant during the welding operation.

Certain materials, called fluxes, when associated with welding electrodes in the form of surface coatings or enclosed within the electrodes profoundly affect the ease with which the arc may be maintained and the character of the deposited metal. They also modify the operating characteristics, such as rate of fusion, depth of penetration, etc. Also, certain treatments prior to the application of the coating material facilitate the adhesion of the coating and improve its effects.

One object of my invention is to provide an electrode which operates best with a short arc and which reduces to a minimum contamination of the deposited metal by the absorption of oxygen and nitrogen from the atmosphere.

Another object of my invention is to provide an electrode, the rate of fusion or deposition of which during welding is comparatively slow and which has a correspondingly increased power of penetration.

Still another object of my invention is to provide an electrode by means of which it is easy to obtain tight, sound welds of neat appearance.

Further objects of my invention will appear from the following description thereof and the scope of the invention will be pointed out in the claims appended hereto.

According to my invention an electrode is provided with a flux of the following composition:—
  Barium carbonate—1 part by weight,
  Calcium carbonate—1 to 5 parts by weight,
  Titanium oxide—1 to 10 parts by weight,
  and for ten parts combined weight of foregoing ingredients
  Sodium acetate—5 to 15 parts by weight,
or
  Liquid sodium silicate—1 to 10 parts by weight, Preferably my flux has the following composition:
  Barium carbonate—1 part by weight
  Calcium carbonate—1 part by weight
  Titanium oxide—2 parts by weight and
  Sodium acetate—4 parts by weight
or
  Liquid sodium silicate 2 parts by weight Other alkaline earth carbonates may be used in place of calcium and barium when using sodium acetate, but for reasons pointed out below I prefer to use carbonates of these metals.

It has already been proposed in Patent No. 1,374,711 to Armor, granted April 12, 1921, to use a flux made from mixing rutile (titanium oxide) with sodium carbonate, a suitable amount of an air-drying binder, such as potassium silicate being added to affix the resulting flux to the electrode. The presence of the sodium carbonate in this flux causes the arc to operate in a stable manner with a comparatively long arc, $\frac{3}{16}$" or longer, but causes the electrode to melt rapidly and become rather drippy in action. But slight penetration is secured under these conditions.

I have found that barium carbonate and calcium carbonate are as effective as sodium carbonate in giving the desired arc stability and at the same time give to the arc certain other desired characteristics not obtainable by using sodium carbonate as has been suggested. Neither of these compounds produce the drippy characteristic resulting when sodium carbonate is used. Furthermore, with barium carbonate it is necessary to maintain a very short arc, best operating conditions being with an arc of about $\frac{1}{16}$ to $\frac{1}{8}$ inch in length. With calcium carbonate, best operating conditions are obtained when using an arc of about $\frac{1}{8}$ to $\frac{3}{16}$ inch in length which is intermediate the conditions imposed by the presence of the sodium carbonate and barium carbonate. Barium carbonate furthermore gives excellent penetration and a slow melting of the rod while the effect of calcium carbonate is intermediate to those imparted by sodium carbonate and barium carbonate in respect to penetration and melting qualities.

It is of decided advantage to have an electrode that will operate with a short arc, yet it is desirable not to have to hold the arc too short. Barium carbonate used alone as a flux gives remarkable penetration but makes it necessary to hold the arc too short for practical success in welding. If calcium carbonate be added an arc of satisfactory length though still short can be held, while obtaining more than ordinary penetration. The addition of titanium oxide to the mixture of barium and calcium carbonates gives smoother flowing characteristics within the range of satisfactory operation. An electrode provided with my improved flux containing barium and calcium carbonates and titanium oxide will not flow smoothly if the operator tends to maintain a long arc and the welder will automatically shorten the arc in order to get a smoothly operating arc. Operation with the short arc imposed by my flux will result in a more ductile deposit since the elements of the air or surrounding atmosphere will not have the same opportunity of attacking the weld metal as when using a long arc. With a short arc, drops do not accumulate on the end of the electrode but go across the arc before reaching any appreciable size. This causes the arc to operate very quietly.

My improved flux may be applied to the exterior of the electrodes as a heavy or a thin coating. On ordinary steel electrodes ranging in size from $\frac{1}{32}$ to $\frac{1}{4}$ inch in thickness, the coating need not be any more than 1/1000 of an inch in thickness to effect the desired result. For high carbon steels the coating should be somewhat thicker and for certain other alloy steels, for example, those containing high percentages of chromium, the coating should be much thicker, the thickness in some cases being as much as one-sixteenth of an inch. The flux may also be applied as a core within the electrode or in an open channel or groove extending lengthwise the electrode.

The sodium acetate of my flux performs two functions. It acts as a binder for the other materials of the flux and, in the presence of the arc, yields a reducing atmosphere of hydrogen and carbon monoxide which shields the arc and deposited metal from the oxygen and nitrogen of the air. While all acetates will not act as binders, all acetates will produce the desired reducing atmosphere and, for this reason, are particularly desirable as a fluxing material which may be used alone as a flux, or in combination with other materials, as specified above. Alkali metal acetates will prove particularly suitable as fluxes for generating about the arc and molten metal at the arc the desired reducing atmosphere of hydrogen and carbon monoxide, as well as exerting a stabilizing action on the arc. It is within the scope of my invention, however, to employ other acetates besides the alkali metal acetates and, in fact, in accordance with my invention any compound of hydrogen and carbon which when heated will dissociate producing an atmosphere of hydrogen and carbon monoxide may be used.

Sodium acetate alone is a very effective flux and gives good arc stability and a very ductile weld. The binding action of sodium acetate is superior to that of sodium silicate. Sodium silicate produces a coating in the form of a solid skin or scale which may crack and flake off when the wire is bent. Sodium acetate will produce a softer adherent coating, part of which may flake off when the wire is bent if the coating is sufficiently heavy, but part of which remains on the wire as an appreciable coating even after the wire has been bent and wiped or rubbed. Sodium acetate also gives a smoother and quieter operation to the arc than sodium silicate and cooperates with other materials in the flux in giving sound ductile material in the weld.

Under certain conditions it may prove desirable to substitute sodium silicate as a binder in the above flux for sodium acetate due to the fact that the latter is more or less hygroscopic with the result that the electrode may become pasty in humid weather and become rust stained giving it an unsightly appearance. This disadvantage can be avoided by applying to the coated rod a water-proofing or moisture-repellant treatment, but for certain operations a coating having sodium silicate substituted for the sodium acetate will be found to be satisfactory.

When sodium acetate is used a water solution is made of that material, using only slightly more water than is necessary to produce a saturated solution and the other materials in powdered form are then added to the solution to form a thin paste. When liquid sodium silicate is used the other materials are mixed with it and the resulting mixture applied as a flux coating to the electrode material. Water may be added to thin the mixture prior to applying it to electrodes. Wires may be coated in short lengths or in coils of indefinite length and the present method of manufacturing the electrodes is as follows:

I have found that if the wire or rod from which the electrode is to be made is pickled in an acid solution prior to the application of the surface coatings, the coatings adhere much better. Pickling also removes oxides and other foreign matter which may exist on the surface of the wire in varying amounts, with detrimental effects. To produce uniform definite characteristics in the electrode, it is necessary to eliminate variable amounts of matter foreign to the steel and to the desired coating ingredients. The effects of some acids, however, are detrimental to the operating characteristics of the electrode to such an extent that the bad effects are not overcome by the subsequent application of the coating materials. I have found that hydrochloric acid will thoroughly clean the surface of the rod, and that any detrimental effect on its arcing characteristics may be easily overcome by the subsequent application of coating materials. A flux of the composition herein disclosed is suitable. In fact a small amount of lime or its equivalent calcium carbonate is sufficient to give smooth arcing characteristics to a rod which has been treated with hydrochloric acid. A weak solution of this acid has been found to be suitable and I prefer to use about a 6% solution.

Before coating the wire, the surface is prepared by dipping it in a 6% solution of hydrochloric acid at a temperature of about 150° F. for a period of about 20 minutes. The temperature of the wire is brought up by immersing in hot water before the pickling operation, and it is again washed in hot water after pickling. This pickling removes iron oxide and gives a roughened surface for the adhesion of the coating material without injuring the arcing characteristics of the coated electrode.

The wire is coated at the same time that it is being put on a reel or in coils, when it is to be used for automatic welding, or at the same time that it is being straightened and cut for hand welding. In some cases it is straightened and cut first and then coated in a subsequent operation. The reeling machine, or the straightening and cutting machine, as the case may be, pulls the wire through the bath of coating material in paste form, and the excess paste is wiped from the surface of the wire as it emerges from the bath by a centripetal air jet. Before entering the bath of paste, the wire may be scoured to clean off any loose oxide or sludge which may adhere to the wire when it leaves the pickle bath.

This operation may be important when the pickling solution has been used for some time and becomes somewhat foul.

It is easy to hold a short arc with the above coated electrode. Oxidation of the metal while passing through the arc is reduced to a minimum by reason of the short arc and furthermore by reason of the reducing action of the elements of the composition. This elimination of the oxidation which usually occurs in the arc avoids the gas pockets so common in arc welds which result from a reaction between the oxide and the carbon content of the steel. Because of the slow rate of fusion or deposition of the electrode and because of its deep penetrating power it is comparatively easy to obtain a through weld on butt joints and to avoid the building up of excess metal on top of the weld. This affords great economy in the amount of welding wire used and gives a neat looking weld.

When a short arc is held with the above described electrode no spattering will occur and while some spattering may occur when the arc lengthens unduly, the lack of superheat in the metal as it leaves the electrode causes it to solidify upon striking a cold surface outside the crater without fusing the surface sufficiently to cause it to stick or weld itself to it and this spattered metal may be brushed away without difficulty. The absence of superheat in the metal as deposited from this electrode also causes the deposited metal to solidify quickly in place. This combined with its slow rate of deposition and its good penetration adapts it particularly well for vertical and overhead welding.

What I claim as new and desire to secure by Letters Patent of the United States, is,—

1. A welding electrode having a flux containing 1 to 5 parts by weight of calcium carbonate to one part by weight of barium carbonate.

2. A welding electrode having a flux comprising a mixture of substantially one to five parts by weight of calcium carbonate and one to ten parts by weight of titanium oxide to one part by weight of barium carbonate.

3. A welding electrode having a flux comprising a mixture of from five to fifteen parts by weight of a compound containing hydrogen, carbon and oxygen dissociable by heat to produce a gaseous atmosphere of hydrogen and carbon monoxide, to ten parts combined weight of the following ingredients: barium carbonate one part by weight; calcium carbonate one to five parts by weight; and titanium oxide one to ten parts by weight.

4. A welding electrode having a composition of substantially one to five parts by weight of calcium carbonate and one to ten parts by weight of titanium oxide to one part by weight of barium carbonate distributed substantially uniformly throughout its length and attached thereto by a binding agent.

5. A welding electrode comprising a metal rod and an alkali acetate distributed substantially uniformly along its length.

6. A welding electrode having a flux of substantially equal parts by weight of alkaline earth carbonates and titanium oxide mixed with about twice as much alkali acetate.

7. A welding electrode having a thin surface coating of substantially equal parts by weight of alkaline earth metal carbonates and titanium oxide mixed with about twice as much sodium acetate.

8. A welding electrode having a surface coating of substantially the following composition: calcium carbonate, one part by weight; barium carbonate, one part by weight; titanium oxide, two parts by weight; and sodium acetate, four parts by weight.

9. The step in the process of preparing a metal electrode for use in arc welding which consists in treating the surface of the electrode in a weak solution of hydrochloric acid.

10. The steps in the process of preparing a metal electrode for use in arc welding which consists in treating the surface of the electrode in a weak solution of hydrochloric acid and subsequently applying thereto a coating containing calcium carbonate.

11. The process of making a coated welding electrode which includes the steps of treating the wire in a weak solution of hydrochloric acid for a sufficient length of time to produce a napped surface thereon and thereafter dipping the electrode material in a thin paste of one part by weight of calcium carbonate, one part by weight of barium carbonate, two parts by weight of titanium oxide, and four parts by weight of sodium acetate.

JAMES M. WEED.